United States Patent Office 3,202,689
Patented Aug. 24, 1965

3,202,689
PROCESS FOR SEPARATING COPPER VALUES FROM COBALT AND NICKEL VALUES
Sherman C. Lashua, Midland, Mich., assignor to The Dow Chemical Company, Midland, Mich., a corporation of Delaware
No Drawing. Original application Sept. 6, 1960, Ser. No. 53,912. Divided and this application Aug. 24, 1964, Ser. No. 397,359
1 Claim. (Cl. 260—438)

This is a division of application Serial No. 53,912, filed September 6, 1960.

The present invention relates to hydroxamic acids, and is more particularly concerned with the novel compounds, N-hydroxymaleamic acid, and its alkali metal salts. The invention also relates to a method of separating copper from solutions containing copper, cobalt and/or nickel ions.

I have found that the reaction of hydroxylamine with maleic anhydride, in a lower alkyl alcoholic solution, proceeds smoothly and rapidly to produce the new compounds N-hydroxymaleamic acid and its alkali metal salts in good yield and purity.

I have further found that N-hydroxymaleamic acid and its salts are capable of sequestering transition metal ions, particularly copper, nickel, cobalt and iron. In solutions containing copper, nickel and/or cobalt ions, copper is selectively precipitated at a pH in the range of about 2.5 to 5.0. The precipitation is essentially quantitative at a pH of about 4.0, thus affording a clear separation of copper from nickel and/or cobalt.

The procedure which has been used for the reaction of maleic anhydride with hydroxylamine to produce N-hydroxymaleamic acid is shown graphically:

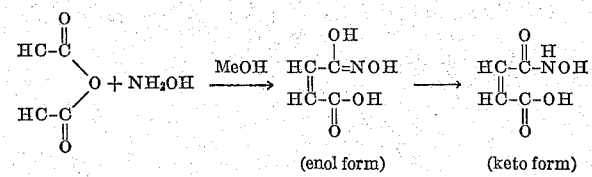

Solutions of 69.5 grams (1 mole) of hydroxylamine hydrochloride in 325 ml. of methanol and 56.0 grams (1 mole) of potassium hydroxide in 140 ml. of methanol were prepared at reflux and then allowed to cool to about 40° C. The solutions were then slowly mixed with swirling and intermittent cooling in an ice bath. The resulting precipitate of KCl was removed by filtration and 98.0 grams (1 mole) of freshly crushed maleic anhydride was added to the hydroxylamine solution with stirring. The anhydride dissolved readily, and a white precipitate formed. After 3 hours the precipitate was collected, washed with methylene chloride and dried in a desiccator. A yield of 60 percent of N-hydroxymaleamic acid was obtained having an initial melting point of 137° C. (enol form as established by nuclear magnetic resonance) which, on standing at room temperature, readily converts to the keto form melting at 125° C.

| Analysis | Percent C | Percent H | Percent N |
|---|---|---|---|
| Calculated | 36.7 | 3.8 | 10.7 |
| Found | 36.5 | 3.8 | 10.8 |

N-hydroxymaleamic acid is recrystallizable from ethanol and is soluble in water, methanol, dimethylformamide, cold concentrated sulfuric acid, warm glacial acetic acid and the like. It is insoluble in non-polar solvents. The titration curve of freshly prepared solutions show breaks at pH 6.4 and 10.7 corresponding to equivalent weights of 130 and 66.1 respectively. The theoretical values are 131 and 65.5.

The sodium and potassium salts of N-hydroxymaleamic acid were prepared as above except 2 moles of the appropriate alkali hydroxide were employed in the hydroxylamine neutralization, thereby providing a 1 mole excess for the subsequent reaction.

Yields of 80% of the salts were obtained having the following analysis:

| Sodium salt: | Percent Na |
|---|---|
| Calculated | 15.0 |
| Found | 15.1 |

| Potassium salt: | Percent K |
|---|---|
| Calculated | 23.0 |
| Found | 20.0 |

N-hydroxymaleamic acid and its salts are exceptionally capable of sequestering iron over a pH range of 4 to 10. At a pH of 9 they are capable of holding approximately 0.5 pounds of ferric ion per pound of reagent. Their ferric ion sequestering ability at 180° F. is greater than that of many other commonly used agents. Over the pH range of 5 to 9, about 0.60 to 1.5 millimoles of ferric ion are sequestered per millimole of N-hydroxymaleamic acid.

The compounds of the present invention are useful for separating copper ions from nickel and/or cobalt ions in solution. In representative operations a solution containing 0.01 mole $NiSO_4 \cdot 6H_2O$, 0.01 mole anhydrous $CuSO_4$ and 0.02 mole of N-hydroxymaleamic in 100 ml. of water was prepared. The initial pH was 1.9. Sodium hydroxide solution (1.0 N.) was added slowly with stirring until the pH reached 3.9. After standing several hours at room temperature the precipitate was filtered, washed with water and dried. The following analysis indicates the removal of about 95 weight percent of the copper from the solution.

*Analysis.*—Copper, 25.0%; Nickel, 0.05%.

A similar experiment using 0.01 mole of $CoSO_4 \cdot 7H_2O$ in place of the $NiSO_4 \cdot 6H_2O$ was performed with the following results, again representing the removal of about 95 weight percent of the copper from the solution.

Copper, 25.5%; cobalt, 0.03%.

Various modifications may be made in the present invention wthout departing from the spirit or scope thereof, and it is understood that I limit myself only as defined in the appended claim.

I claim:

A method of separating copper ions from a solution containing copper ions and contaminating ions of at least one of the metals of the group consisting of cobalt and nickel ions which comprises contacting the solution at a pH in the range of 2.5 to 5.0, with N-hydroxymaleamic acid, thereby forming a precipitate containing the copper ions and separating therefrom the precipitate containing the copper.

No references cited.

MAURICE A. BRINDISI, *Primary examiner.*